US012745879B2

(12) United States Patent
Caruso

(10) Patent No.: US 12,745,879 B2
(45) Date of Patent: Sep. 29, 2026

(54) WORKSURFACE AND/OR SINK DEVICES

(71) Applicant: Steven Jerome Caruso, Antioch, IL (US)

(72) Inventor: Steven Jerome Caruso, Antioch, IL (US)

( * ) Notice: Subject to any disclaimer, the term of this patent is extended or adjusted under 35 U.S.C. 154(b) by 9 days.

(21) Appl. No.: 18/593,888

(22) Filed: Mar. 2, 2024

(65) Prior Publication Data

US 2024/0315492 A1 Sep. 26, 2024

Related U.S. Application Data

(60) Provisional application No. 63/449,858, filed on Mar. 3, 2023.

(51) Int. Cl.
*A47J 47/20* (2019.01)

(52) U.S. Cl.
CPC .................................... *A47J 47/20* (2013.01)

(58) Field of Classification Search
CPC ................................ A47J 47/20; A47J 47/005
USPC ......... 4/656, 654, 637, 520; 68/233; 108/24; 34/238
See application file for complete search history.

(56) References Cited

U.S. PATENT DOCUMENTS

| | | | | | |
|---|---|---|---|---|---|
| 2,779,997 | A * | 2/1957 | Borman | E03C 1/33 | 29/458 |
| 4,456,021 | A * | 6/1984 | Leavens | E03C 1/182 | 134/115 R |
| 6,062,397 | A * | 5/2000 | Licari | A47J 47/20 | D32/55 |
| 6,182,305 | B1 * | 2/2001 | O'Connell | A47J 47/005 | 4/631 |
| 6,213,333 | B1 * | 4/2001 | Icard | A47J 47/20 | 220/482 |
| 6,463,862 | B1 * | 10/2002 | Kuhlman | B01L 9/02 | 108/50.01 |
| 6,508,368 | B1 * | 1/2003 | Arce, Jr. | A47J 47/20 | 211/41.3 |
| 6,776,105 | B2 * | 8/2004 | Rivera | A47K 1/02 | 108/34 |
| 9,185,970 | B1 * | 11/2015 | Lyewarun | A47B 3/08 | |
| 2002/0000433 | A1 * | 1/2002 | Weiss | F24C 15/30 | 219/460.1 |
| 2004/0093667 | A1 * | 5/2004 | Erickson | A47B 77/06 | 4/631 |
| 2010/0275369 | A1 * | 11/2010 | Eilmus | A47J 47/005 | 4/631 |
| 2012/0261871 | A1 * | 10/2012 | Kaufmann | A47J 47/005 | 269/16 |
| 2014/0027966 | A1 * | 1/2014 | Constantino, Jr. | A47J 47/16 | 269/15 |
| 2021/0244237 | A1 * | 8/2021 | Barton | A47B 33/00 | |

FOREIGN PATENT DOCUMENTS

| | | | | |
|---|---|---|---|---|
| CN | 112386005 A * | 2/2021 | A47J 45/02 |
| EP | 2324743 A1 * | 5/2011 | A47J 47/005 |
| JP | 2006115869 A * | 5/2006 | A47J 45/02 |

* cited by examiner

*Primary Examiner* — Lori L Baker

(57) ABSTRACT

Structures and methods of manipulating various food preparation items or utensils in conjunction with counter-tops, work-surfaces and sinks have been disclosed. The structures enable food preparation items or utensils to traverse over a sink, and/or beyond a sink, and enable food preparation items or utensils to be used with sinks not currently equipped to do so.

20 Claims, 14 Drawing Sheets

WORKSURFACE AND/OR SINK DEVICES

RELATED APPLICATIONS

This application claims priority from provisional application Ser. No. 63/449,858, filed Mar. 3, 2023 titled “Useful Devices”.

BACKGROUND OF THE INVENTION

The present invention relates to devices used with work-surfaces and/or sink structures.

BRIEF SUMMARY OF THE INVENTION

The present invention relates to devices used to be used with a countertop, table, worksurface and/or a sink. This functionality of this new approach and structure is referred to by the inventor as “Above And Beyond™”, as the utensils are enabled to traverse above a sink and beyond the confines of a sink. This is in stark contrast to the known structures for the category of sinks regarded as “Galley” style sinks. The structure or method further may include a means and methods to enable the manipulation of surfaces and containers relative to a work-surface which may include a sink.

BRIEF DESCRIPTION OF SEVERAL VIEWS OF THE DRAWINGS

FIG. 12 is a trimetric view that structurally shows how aspects of the device may be sizable for the work-surface and/or sinks that it may be used with.

REFERENCE CHARACTERS USED

Figure 1:
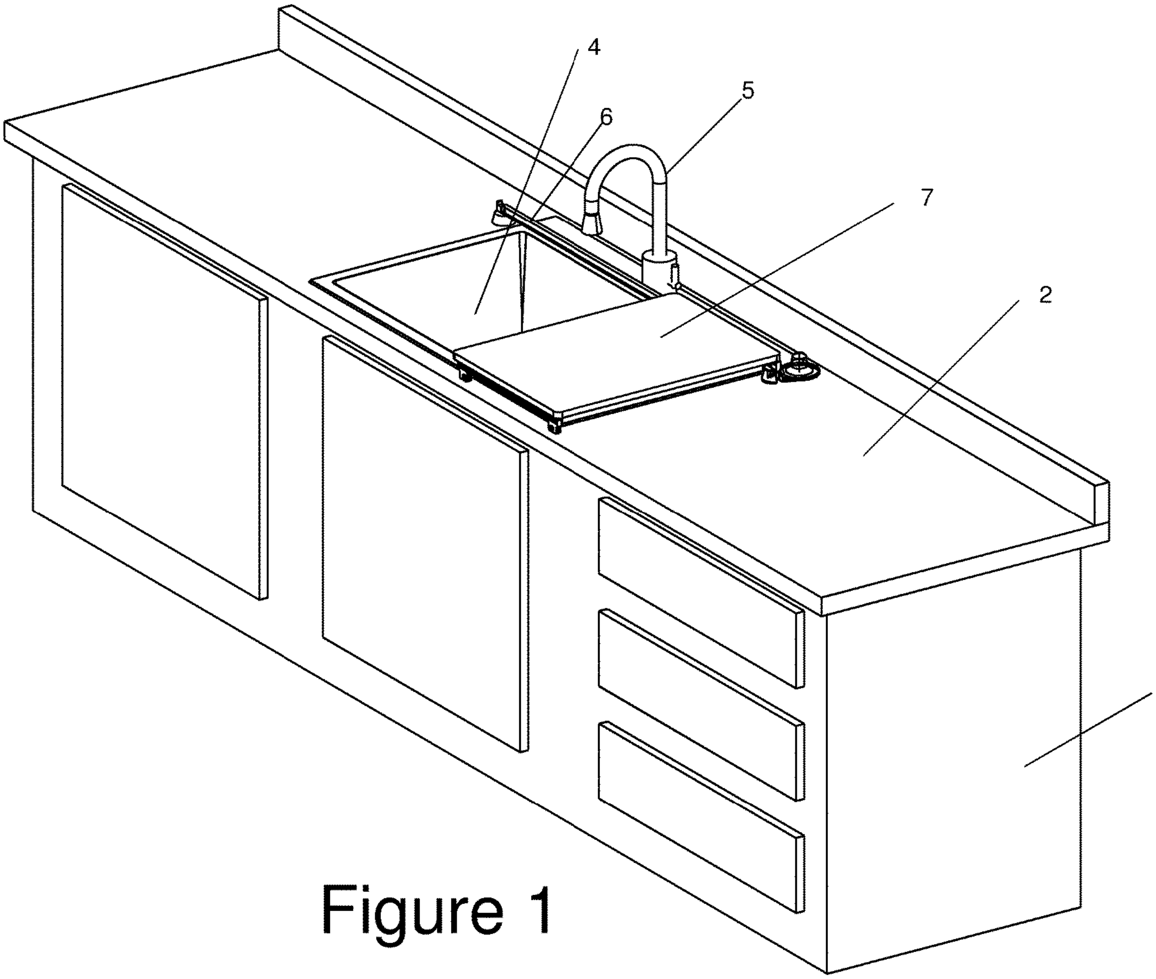
FIG. 1 is a trimetric view of the invention in a use case on a counter and the counter includes a sink. Of note is that in many embodiments, especially those that are “railed”, the sink need not be undermount for the invention to work, the sink may be what is regarded as “lipped” “drop-in” or “self-rimming” or “top-mount sinks”. as the rear or the utensils traverse upon a rail in front of a faucet where there is often no landing for wheels/slides; and above the sink and the front of the utensils, and/or utensil frames/support wheels/guides are able to traverse in front of a sink lip if present. This makes for a universal solution.

Referring to the figures; the following reference characters are used in the drawings of refer to the parts of the present invention. Like reference characters indicate like or corresponding parts in the respective views.

1—Wheel/Low friction sliding structure
2—Counter
3—Cabinet
4—Sink
5—Faucet
6—Main Rail-Guide
7—Cutting Board/Colander/Dish Rack/caddy/carrier/support or other food prep/cleaning accessory
8—Wheel/Slider Assembly
9—Sink Wall Clamp/Cleat
10—Integral to Faucet Clamp/Cleat
11—Pivot
12—Lower Rail-Guide protrusion
13—Surface Cleat—in some embodiments suction enabled or bonded
14—Spring-extension and/or compression and/or constant force
15—Rail-guide slider—which may include bearings and/or wheels
16—brake assembly/brake lever
17—Wheel/Slider assembly garage
18—Front assembly, may be part of 7
19—Rail-guide extension
20—hook/edge of 19
21—step-pad of 19
22—Mounting feature and/or support for cutting boards, colanders, drying racks, containers or other kitchen utensil.
23—Fore aft-Telescopic extension
24—Fore aft-Telescopic extension
25—Lateral Telescopic extension for sections 6
26—Intermediate support area of 25 to counter
27—Suction device push button of 13

28—Integral to device-Faucet Clamp/Cleat (Depicted as a ring embodiment)
29—$2^{nd}$ tier riser/can be integral with associated parts
30—Stud
31—sink based mounting feature
32—Separate Cleat/clamp added to a faucet
33—Brake shoe to wheel leg
34—Brake shoe to counter/work-surface leg
35—Drying rack/another exemplary utensil
36—Food-utensil bin
38—Brake coupling linkage
39—Adjustable dimension
40—Grooved-Guide
41—Lower in sink rail-guide(s)
42—Lower in sink rail-guide(s) hangers

DETAILED DESCRIPTION OF THE INVENTION

While the invention will be described in connection with several preferred embodiments, it will be understood that the invention is not limited to these embodiments. On the contrary, the invention includes all alternatives, modifications, combinations, and equivalents as may be included within the spirit and scope of the appended claims.

There are a variety of items used in workplace scenario whether it be a benchtop a kitchen counter or a counter with a sink. A popular trend is to make these various items work together in new ways. One of these new ways is what is referred to as a "workstation sink" or "galley sink". This is a sink that is capable of receiving items such as cutting boards, colanders, containers, dish racks and other often used items in a sink. The problem is that the sink itself must be designed to accommodate these items. Steps are created so that the aforementioned items may sit in and slide upon said steps. Not only, must a sink be designed to have this capability, it creates (the steps) another surface(s) and corners to clean, and increases the footprint of the sink, or reduces the interior space of the sink. Additionally, items are limited to being only able to slide within the width of the sink. Additionally yet, in order to have multiple tiers, i.e. one on top of another, the accessories often must be separately sized for each tier. It should be noted that the inventions disclosed herein may be used in conjunction or constructed as part of a discreet galley or workstation sink. As such, the inventions herein are both a replacement for, and/or a complimentary structures for galley or workstation sinks.

The present invention solves all of these problems, may work with a sink and actually extend the working area of the sink, and thus work in conjunction with countertops as well. Thus the present invention relates to devices used to be used with a countertop and/or a sink.

The structure or method further may include a means and methods to enable the manipulation of surfaces and containers relative to a work-surface which may include a sink. The present invention structurally accomplishes the aforementioned by creating one or more structures that are disposed above or within a work-surface and/or sink.

Referring now to the figures. The terms Rail-Guide, Guide-rail, and Groove(d)-Guide, as well as the absence of these features, (Rail-Guide-less and Groove(d)-Guide-less) are used throughout the disclosure. Collectively these are all "Guide/Guides/Guided" structures, and/or "guide/guide-less" structures.

FIG. 1 is a trimetric view of one structural embodiment of the invention in a use case on a counter 2, and the counter includes a sink 4 and the counter and sink are mounted on cabinets 3. A cutting board, or other accessory 7, can be seen disposed over part of (generally ¼ to ½) the sink 4. These accessories, 7, may traverse laterally over the sink and beyond as will be described with reference to the other figures.

Figure 2:
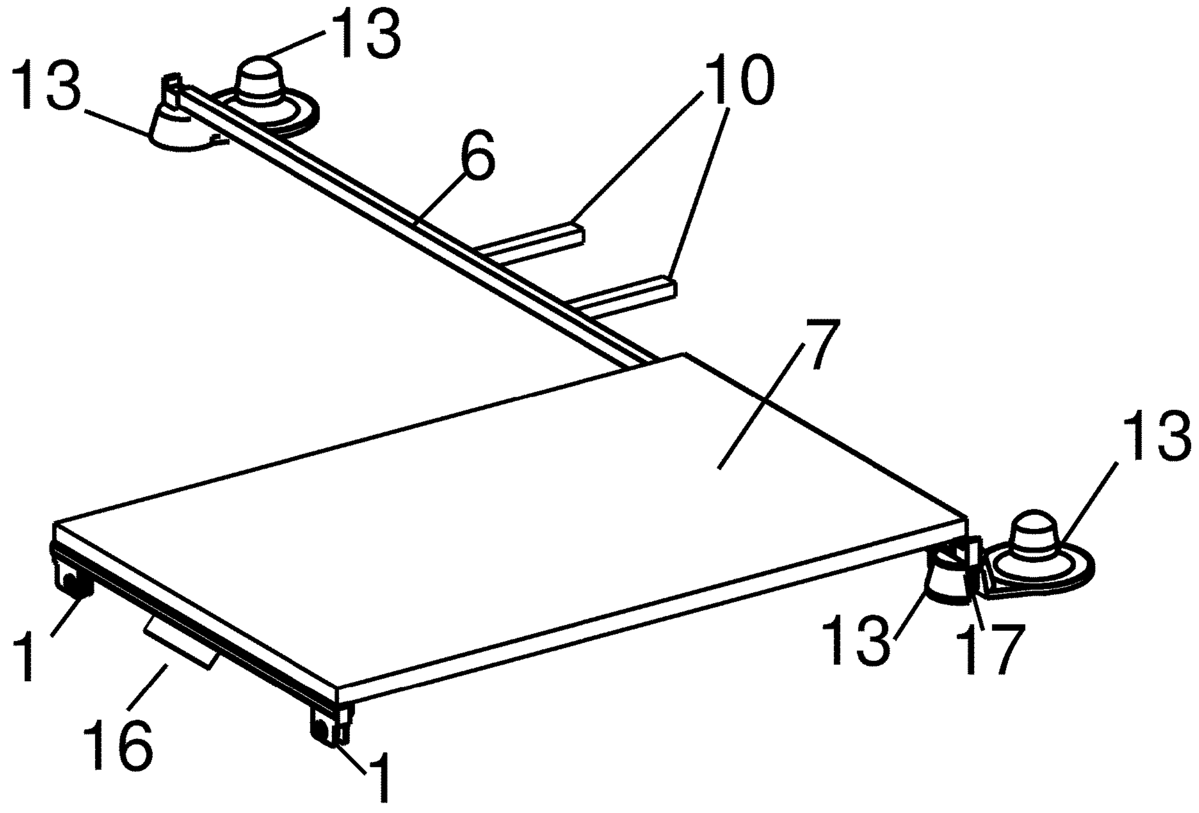
FIG. 2 is a trimetric view of the invention in isolation from the counter/sink of FIG. 1.

FIG. 2 is a trimetric view of the invention in isolation from the counter/sink of FIG. 1. Here we can see in greater detail how the steps of galley sink are obviated, making it so that any sink may be used, or even no sink may be used (counter only), and that the travel of the accessories 7, is not limited or dictated by the size of the sink basin. Here we can see that a rail-guide system is created at the back of the sink. (Other embodiments anticipate a rail-guide at the front of the sink as well And additionally, rail-guides may be stacked creating multiple tiers of accessory functionality). This rail-guide system, is secured in at least one of several ways. Surface cleat(s) 13, may be affixed to the table/countertop frictionally, by way of adhesive, by way of mechanical fastener, or in a preferred embodiment, by way of suction cups. It can be seen that the utensil 7, may traverse leftward (in this view) upon main rail-guide 6. In additional embodiments it may traverse rightward (in this view) as well, as will be described below in this disclosure with reference to additional views.

Figure 3:
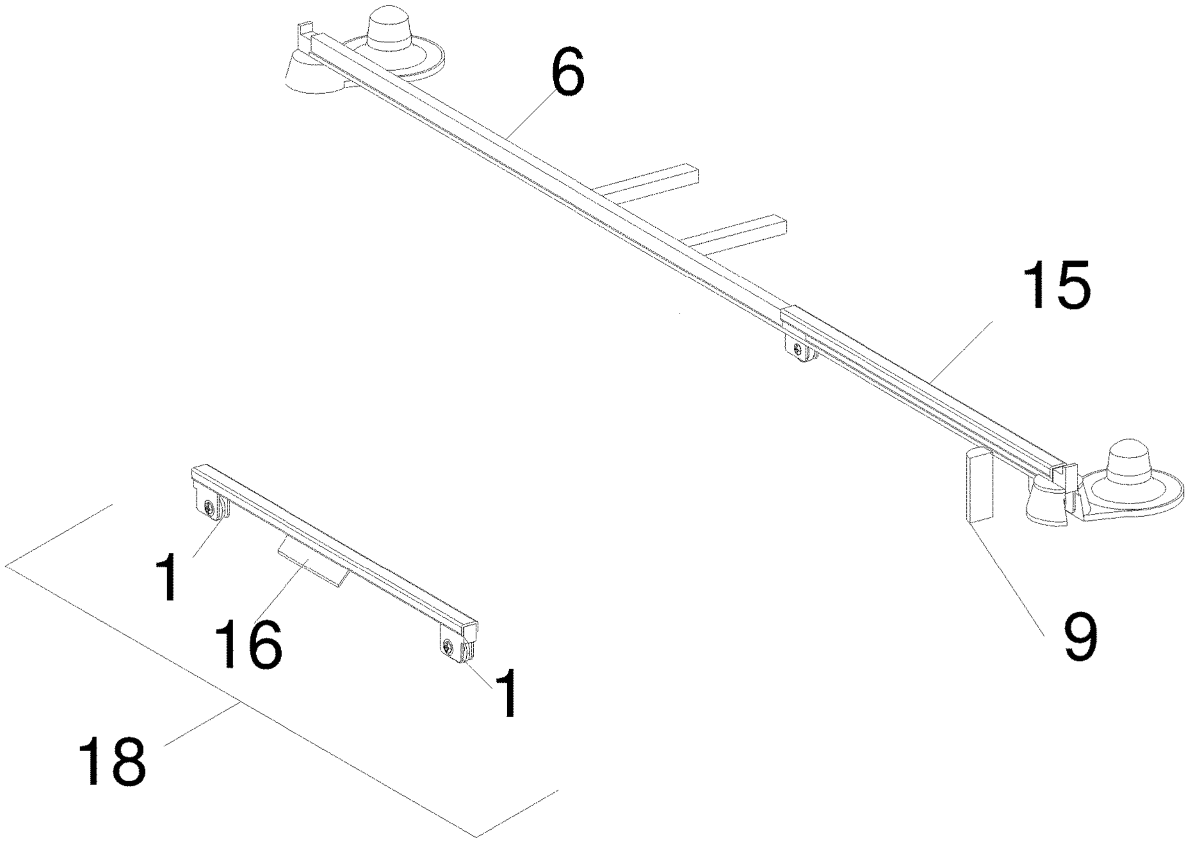
FIG. 3 is a trimetric view of the invention of FIGS. 1 and 2 with one of the elements 3, partially removed for clarity.

Referring now to FIG. 3 which is a trimetric view of the invention of FIGS. 1 and 2 with some of the elements, partially removed for clarity.

It can be seen at the accessories are able to slide on the rail-guide at the rear via rail-guide slider 15 (which may include wheels or sliders-sliding elements) which can be constructed or attached to the accessories 7. At the front of the sink, the accessories have a front assembly 18, which can be constructed or attached to the accessories 7 that includes wheels/sliders 1, and optionally a lateral brake/brake release that locks the wheels or engages the countertop surface preventing unwanted movement. As already described, other embodiments anticipate a rail-guide such as that of the rear, at the front as well. Such a brake system structure is not only applicable to the aforementioned rail-guided designs but also applicable to rail-guide-less embodiments such as those depicted in FIGS. 8 and 9, as securing rail-guide-less designs to prevent unwanted movement when cutting on a cutting board, working with a basket etc. for safety is a novel approach.

It can be seen that there are additional rail-guide securing means, may include in-sink anchors/cleats 9, and faucet stabilizers 10. These may attach and be slidably adjustable via lower rail-guide protrusion 12 yet be clear of rail-guide slider 15.

Figure 4:
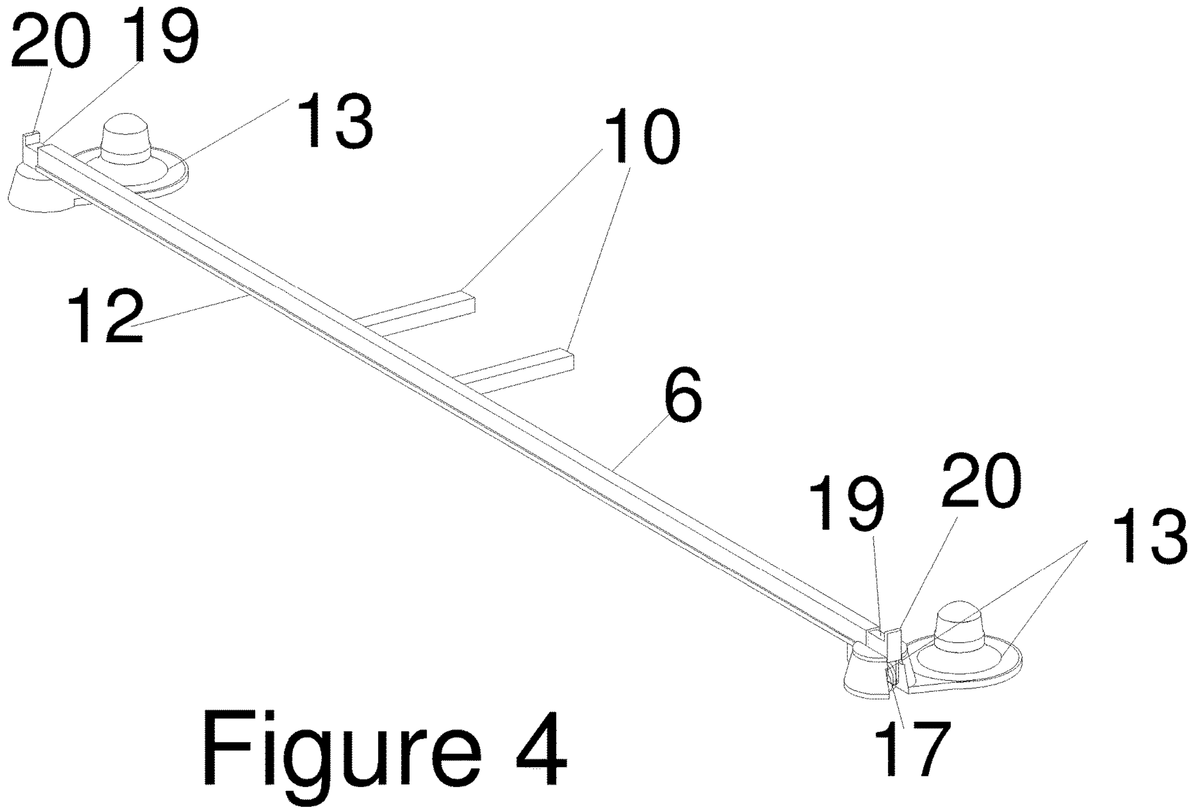
FIG. 4 is a trimetric view of the invention of FIGS. 1-3 with one of the elements 3, fully removed for clarity.

FIG. 4 is a trimetric view of the invention of FIGS. 1-3 with more of the elements 3, removed for clarity. Rail-guide extension 19 can be seen as well as hook or similar structure 20. Rail-guide extension 19, may be disposed in a preferred embodiment at least in part inside of Main rail-guide 6 and is laterally slidable relative to rest of the assembly. (Alternative embodiments anticipate it's sleeving onto or over at least a part of Main rail-guide 6, for example at lower rail-guide protrusion 12.)

Figure 5:
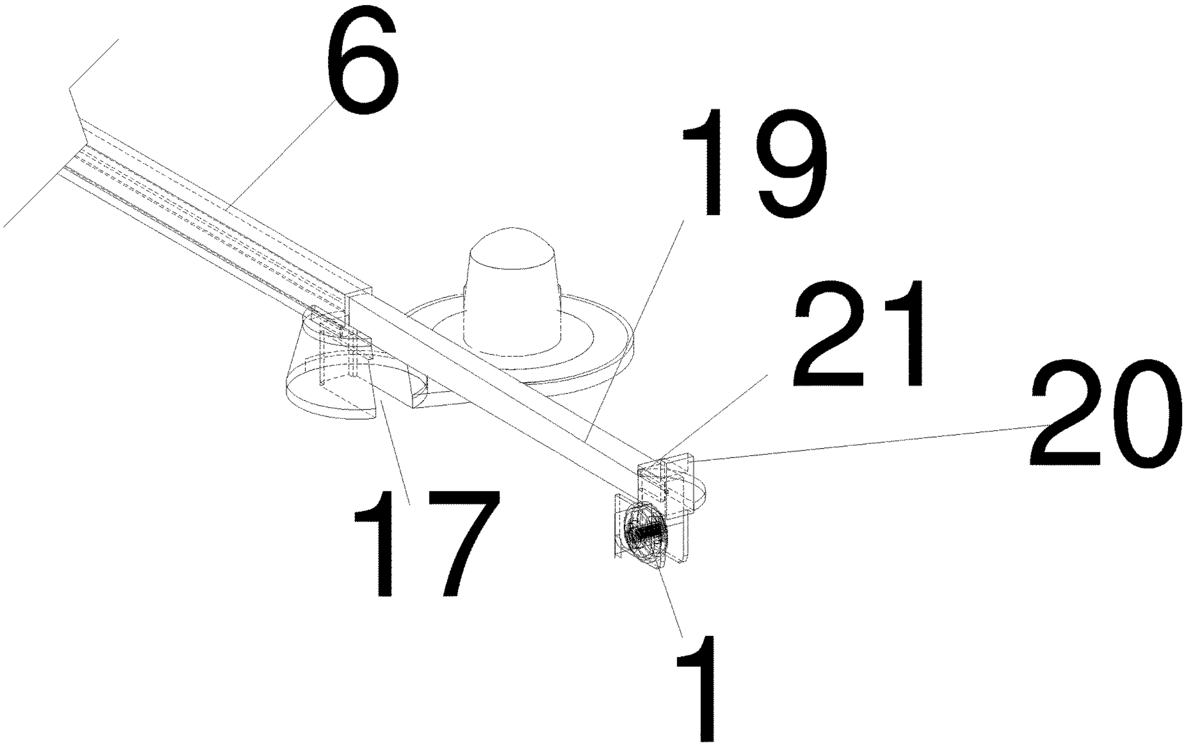
FIG. 5 is a detail trimetric view of the invention of FIG. 1-4 showing how extended positions are structurally enabled.

Referring now to FIG. 5 which is a detail trimetric view of the invention of FIGS. 1-4 showing how extended positions are structurally enabled. When accessory 7, (not shown in this view for clarity) slides across Main rail-guide 6, on rail-guide slider 15, it then engages 20 hook/edge of 19, and causes rail-guide extension 19 to slide outward relative entire assembly and main rail-guide 6, riding on wheel or glide 1, which was disposed in wheel/slider assembly garage (purely for aesthetic and functional cleanliness) thus extending out the rail-guide extension and thus the accessory to a new functional position adjacent to the sink, thereby vastly increasing one's working area beyond the devices original footprint and also beyond the sink structure. Of note is the step-pad 21, that structurally accommodates the accessory 7, and keeps it appropriately level regardless of the level of the rail-guide extension 19. The rail-guide extension assembly may be spring-loaded and so in addition to the frictional forces of reversing the action the rail-guide extension 19, may be assisted in going into its contracted position when accessory 7, is slid the opposite direction. It should be appreciated, how these assemblies may be used not only disposed over sinks, but adjacent or completely separately on work surfaces enabling new functionality and ease for users.

Figure 6:
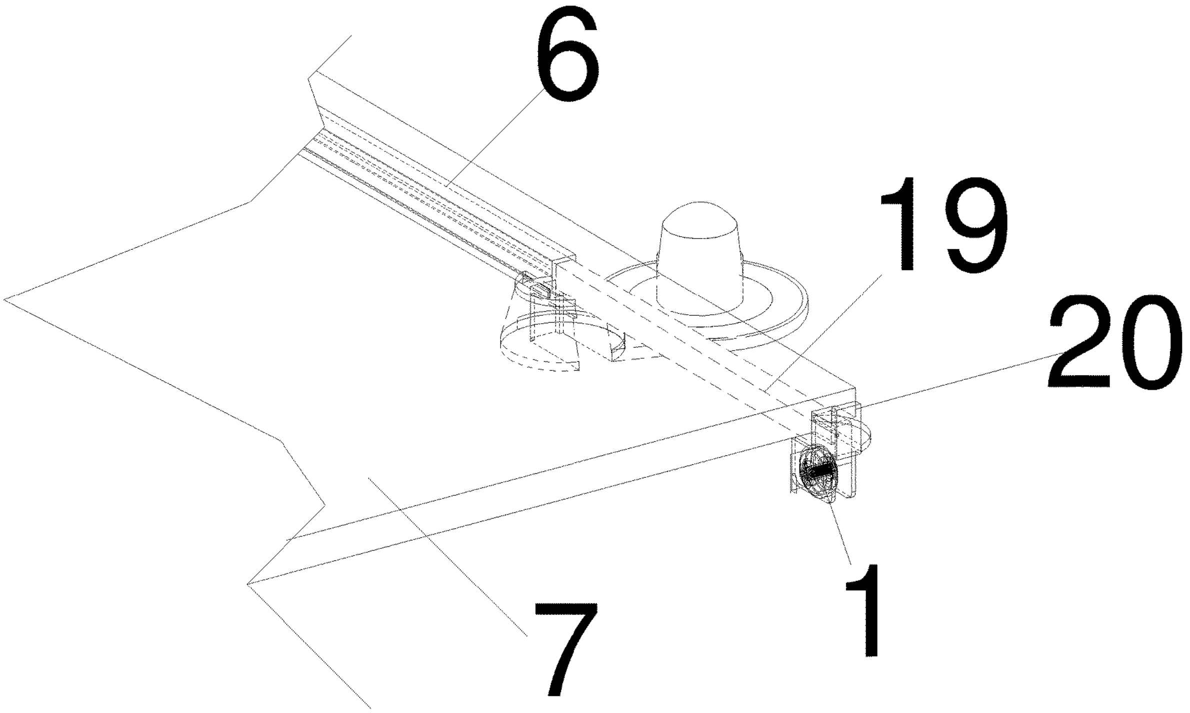
FIG. 6 is much like FIG. 5 but shows one such utensil 7, a cutting board in place.

FIG. 6 is much like FIG. 5 but shows one such utensil 7, a cutting board in place again, rail-guide slider 15 is not shown in this view for clarity. FIG. 6 may be considered as a second/alternate position of where FIG. 2 is a first/alternate position. However it should be appreciated that the action of rail-guide slider becomes uniquely transitional as the rail-guide extension process occurs. I.E. the accessory 7, goes from just sliding on rail-guide slider 15, (which may include bearings and/or wheels) to both sliding on one side (left side in views 5 and 6) and being carried by rail-guide extension 19, once it has seated itself on level maintaining step pad 21, hook 20, and the user continues to move the accessory rightward in views 5 and 6. In this way the user may translate utensils not just over the sink, but over/onto the adjacent counter work-surfaces as well. Alternative embodiments anticipate and include the rail-guides not being telescopic but sized appropriately for the amount of traversal desired.

Figure 7A:
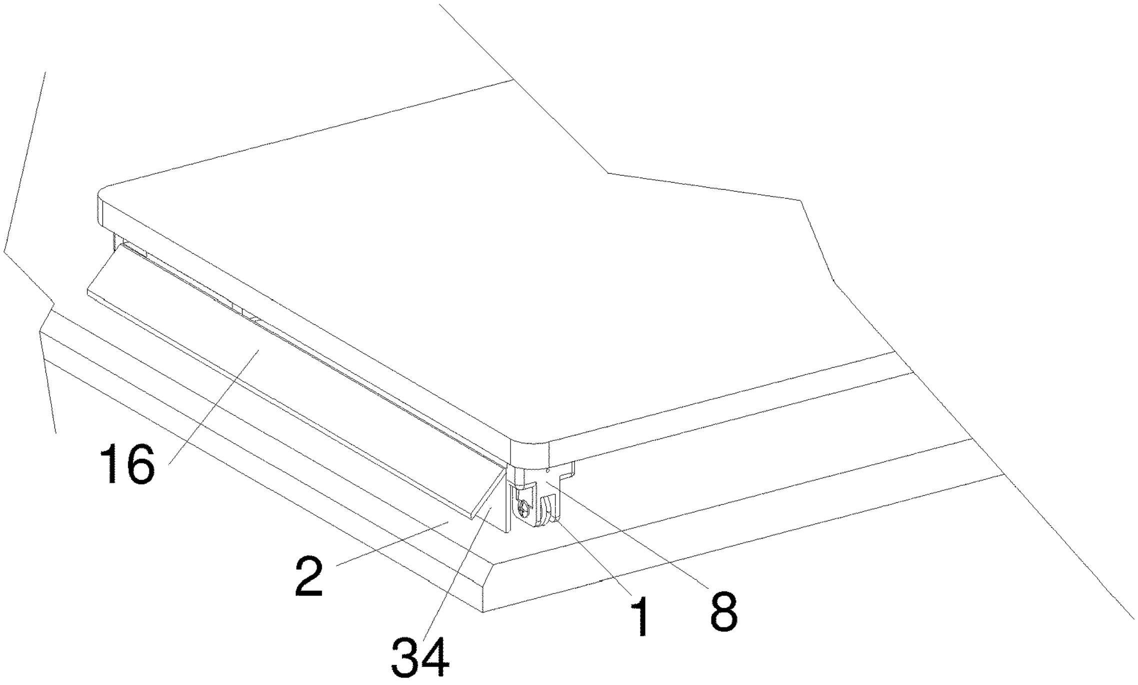
FIG. 7A-7C are a collection of views showing embodiments that contemplate structural braking systems for the utensils or utensil frames/caddy.
Figure 7B:
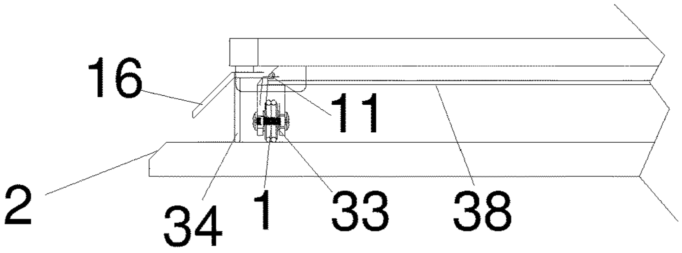
Figure 7C:
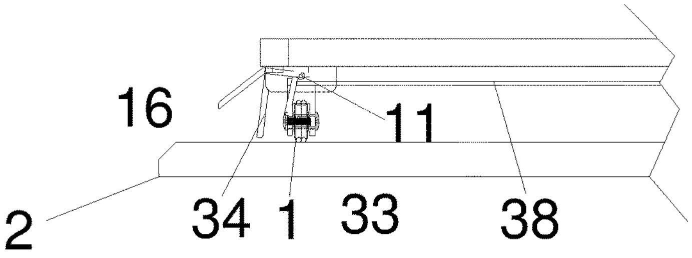
Figure 8:
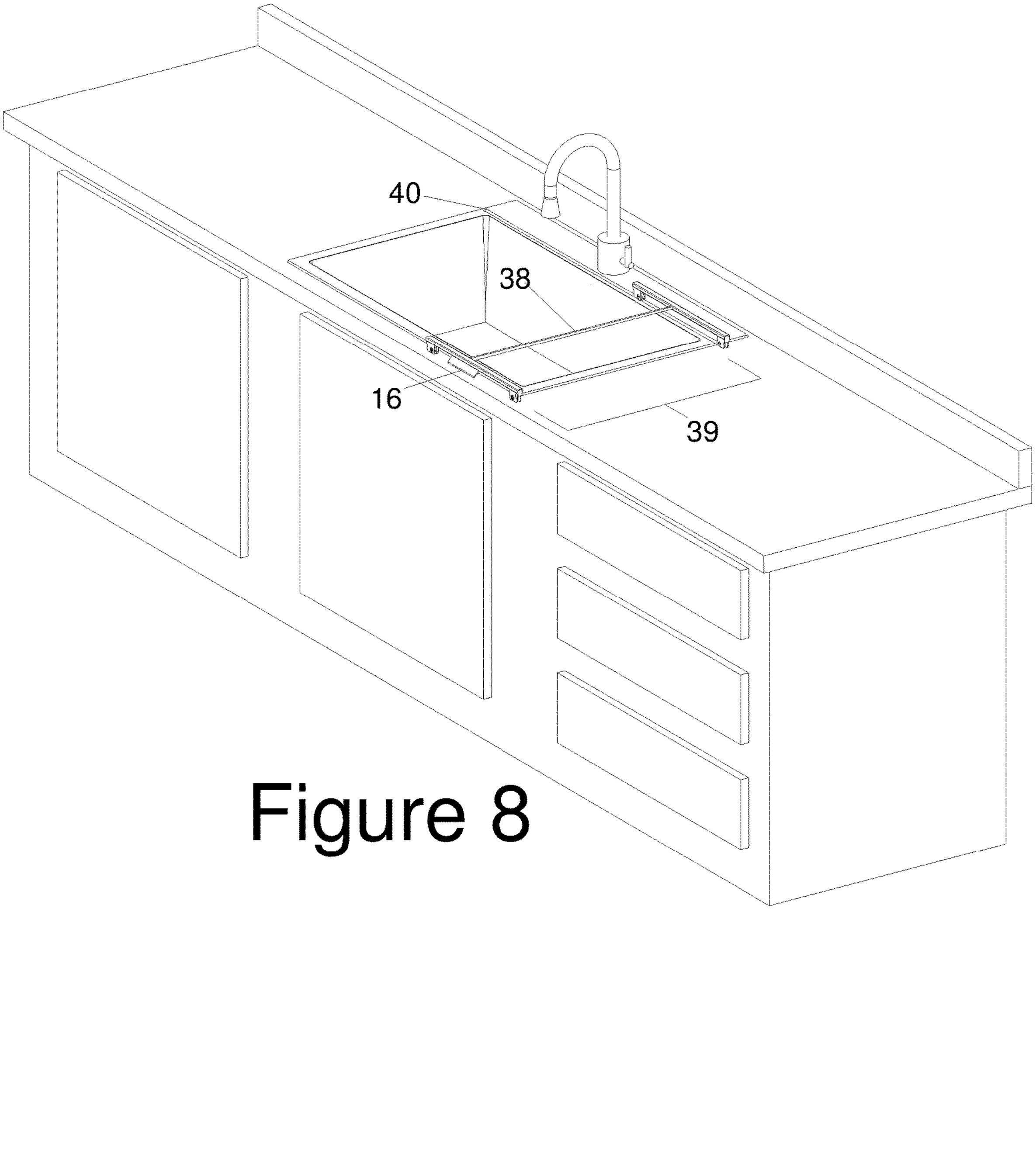
FIG. 8 shows embodiments that structurally traverse over the sink area or on the counter using a front and rear, rail-less trolley system for the utensils 7. In this figure the utensils are not shown, just the trolley system. Such a trolley system may be a part of the utensil, or constructed as a separate device to carry a utensil(s). Additionally some embodiments include a Guide-groove structure 40, either constructed as part of the sink, or as an added structure. When present, guide groove 40 structurally functions as Rail Guide 6, to accurately laterally guide the utensils in the oft narrow area between a faucet and a sink bowl.

Referring now to FIGS. 7A-7C a collection of views can be seen showing embodiments that contemplate structural braking systems for the utensils or utensil frames/caddy. FIG. 7A is a trimetric of an area of the invention as well as a section of a work-surface counter 2. FIGS. 7B and 7C are side views of FIG. 7A. 7B is a depiction with the brake applied, and FIG. 7C is a depiction of the brake being released. Thus referring to all three figures, brake lever 16 can be seen as well as brake shoe to wheel leg 33, and brake shoe to counter/work-surface leg 34. Brake lever 16 in a preferred embodiment is spring biased to be locked as in FIG. 7B and pivots about 11. As such either or both brake shoe to wheel is engaged, preventing wheel from rotating and/or brake shoe (high friction area of contact) to counter/work-surface leg 34 is engaged preventing assembly from moving. While both types of brakes are depicted, and could be used simultaneously, only one is necessary in some embodiments. brake shoe (high friction area of contact) to counter/work-surface leg 34 is advantageous when the system is wheel-less and is using a slider in the front assembly 8, of the carrier/caddy/utensil. Also seen in FIGS. 7B, 7C, and FIG. 8 is optional brake coupler 38. Brake coupler 38 is for embodiments that include a rearward brake shoe that engages the main slide rail-guide 6, in the case of rail-guided embodiments, or engages the wheels/countertop-work-surface in those embodiments that are rail-guide-less and have wheels or sliders at the rear of the caddy/utensil such as in FIGS. 8 and 9. In this way the user needs only to engage/disengage lever/button 16 from one location, yet braking is accomplished throughout the device for in-use/stability when the device/utensil is not in translation mode.

FIG. 8 shows embodiments that structurally traverse over the sink area or on the counter using a front and rear, rail-guide-less trolley system for the utensils 7. In this figure the utensils are not shown, just the trolley system. Such a trolley system may be a part of the utensil, or constructed as a separate device to carry a utensil(s). This trolly/utensil system may have telescopic components or attachment points for its low friction sliding elements, 1, to enable a user to alter its stance reflected by adjustable dimension 39, to be able to straddle sinks of differing depth dimensions.

Additionally some embodiments include a groove guide-structure 40, either constructed as part of the sink, or as an added structure. When present, groove guide 40 structurally functions as Rail Guide 6, to accurately laterally guide the utensils in the oft narrow area between a faucet and a sink bowl. And Guide-groove structure 40, may selectively/optionally be structurally constructed to be open-ended, so that the utensils may traverse onto the counter adjacent the sink as has been described with regard to other embodiments.

Figure 9:
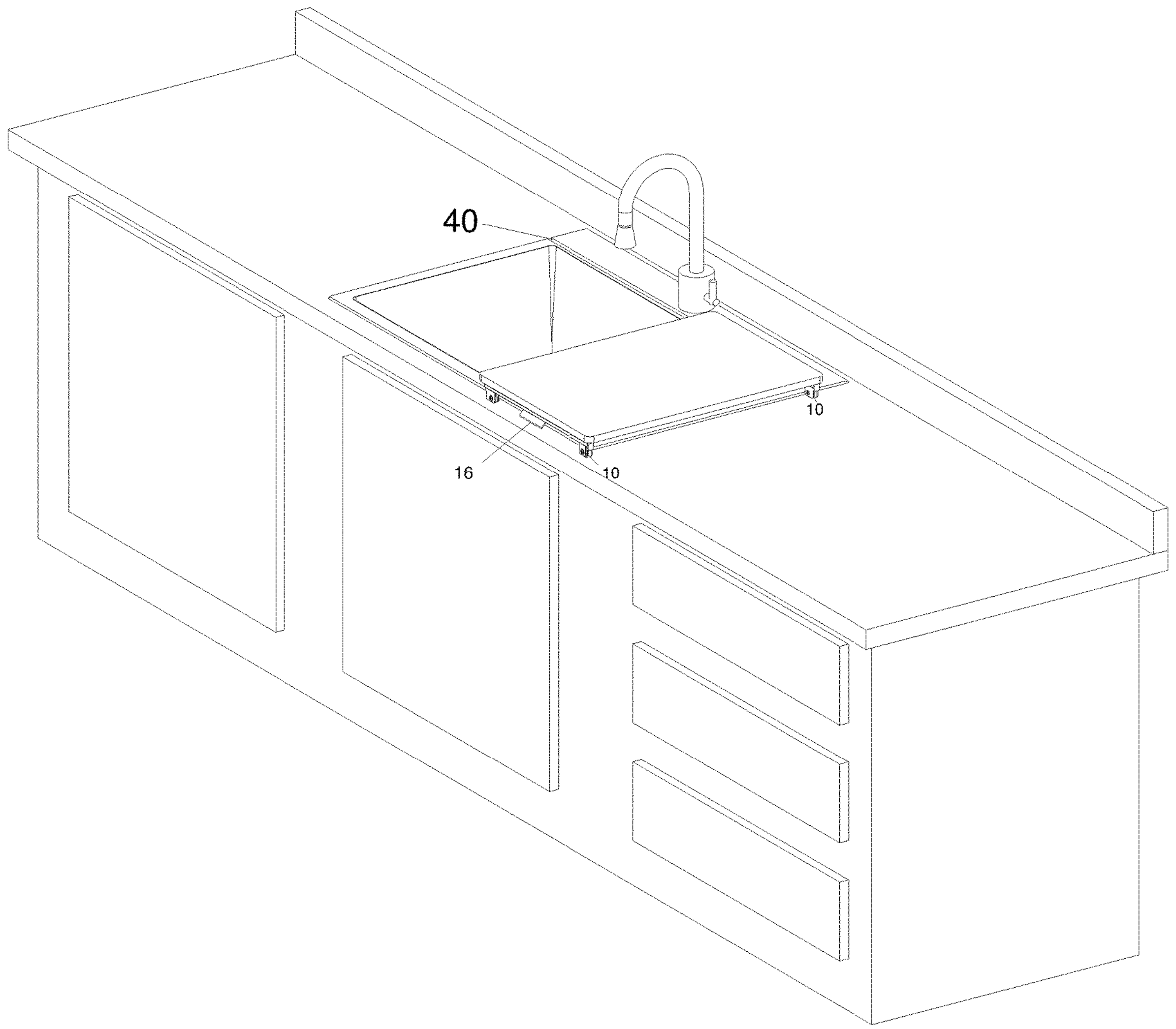
FIG. 9 builds on FIG. 8 and shows embodiments that structurally traverse over the sink area or on the counter using a trolley system for the utensils 7. In this figure a utensil 7, a cutting board is shown. While these embodiments (FIGS. 8 and 9) work best with a flush or undermount sink or a sink with a minimal step, when Groove-Guide 40, is not present, they none the less do work with non undermount sinks.

FIG. 9 builds on FIG. 8 and shows embodiments that structurally traverse over the sink area or on the counter using a trolley system for the utensils 7. In this figure a utensil 7, a cutting board is shown, and it can be seen exiting optionally open ended groove guide 40.

Figure 10:
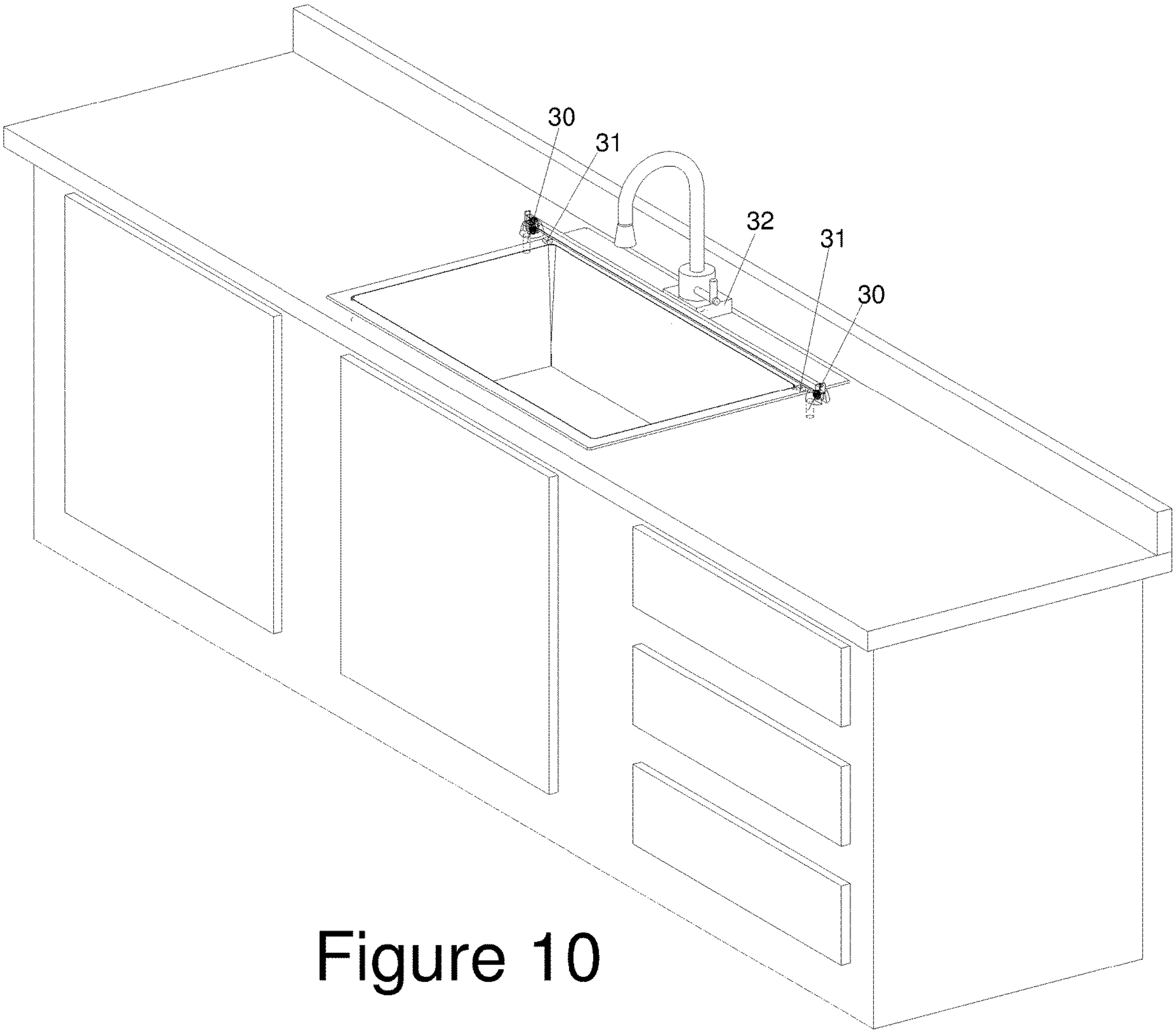
FIG. 10 shows the Cabinets and Rear Guide Rail only, but in a non extended position as discussed with reference to FIGS. 5 and 6.

FIG. 10 is representative of cleats and other methods of affixing features provided as a part of a faucet, part of a sink, part of the countertop or as a stud or cleat threaded or bonded/glued with epoxies or silicones or other formulation into the worksurface and/or countertop and/or faucet and/or sink and/or by affixing/clamping/bonding/gluing a stationary part of the device to at least a portion of worksurface and/or, the sink and/or a faucet. Such feature(s) may also be separately addable to a faucet/work-surface/sink. As in FIG. 10 where depicted clamp/cleat 32 is added to a specific or generic faucet to make it structurally capable and ready to support the use of the rest of the disclosed device(s).

Additionally yet, embodiments include structures where the rail guides, 6, and/or groove guides 40, are formed integrally as part of the sink structure as standing rib(s) and/or recessed groove(s).

And so FIG. 10, is an exemplary figure of multiple embodiments that anticipate structures built into or added to a countertop, faucet or sink to facilitate the securing of the conveyance rail-guides and/or groove-guides of the invention.

Figure 11:
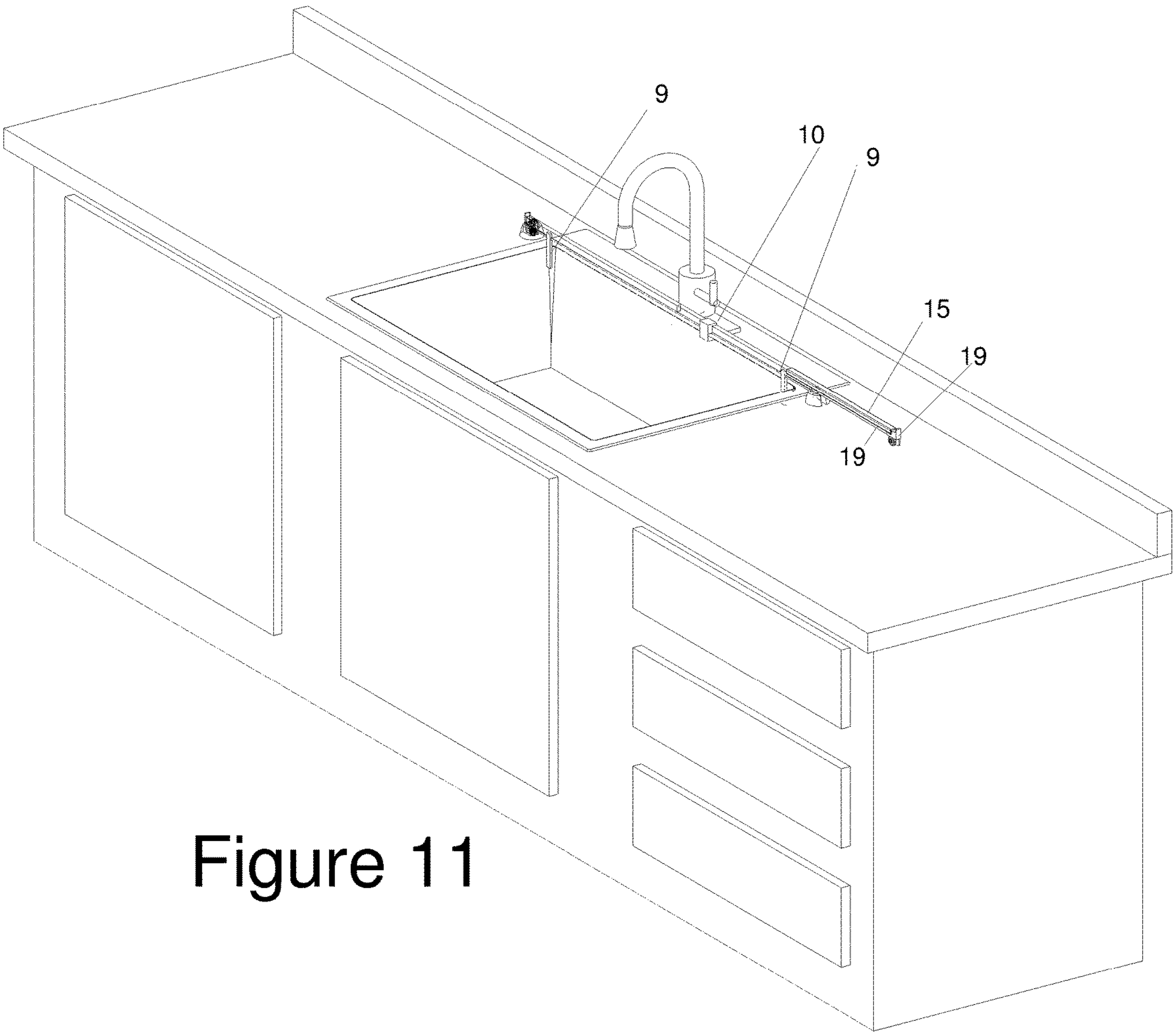
FIG. 11 shows the Cabinets and Rear Guide Rail only, but in an extended position and with a slider 15 disposed on top as discussed with reference to FIGS. 5 and 6.

FIG. 11 shows the Cabinets and Rear Guide Rail only, but in an extended position as discussed with reference to FIGS. 5 and 6. As such, it should be appreciated that the user is able to move the utensil (not shown) or a utensil carrier not just over the sink but over the counter as well as the rails may extend further than the sink envelope, or have telescopic extensions. FIG. 11 also shows that Faucet Clamp/Cleat 10, may be provided as an integral part/area/feature of the faucet for securing the device(s) of the invention. In this way, a faucet may be provided with a feature(s) exemplified in one embodiment as feature 10, that makes the faucet and thus the sink area structurally capable and ready to support the use of the rest of the disclosed device(s).

Figure 12:
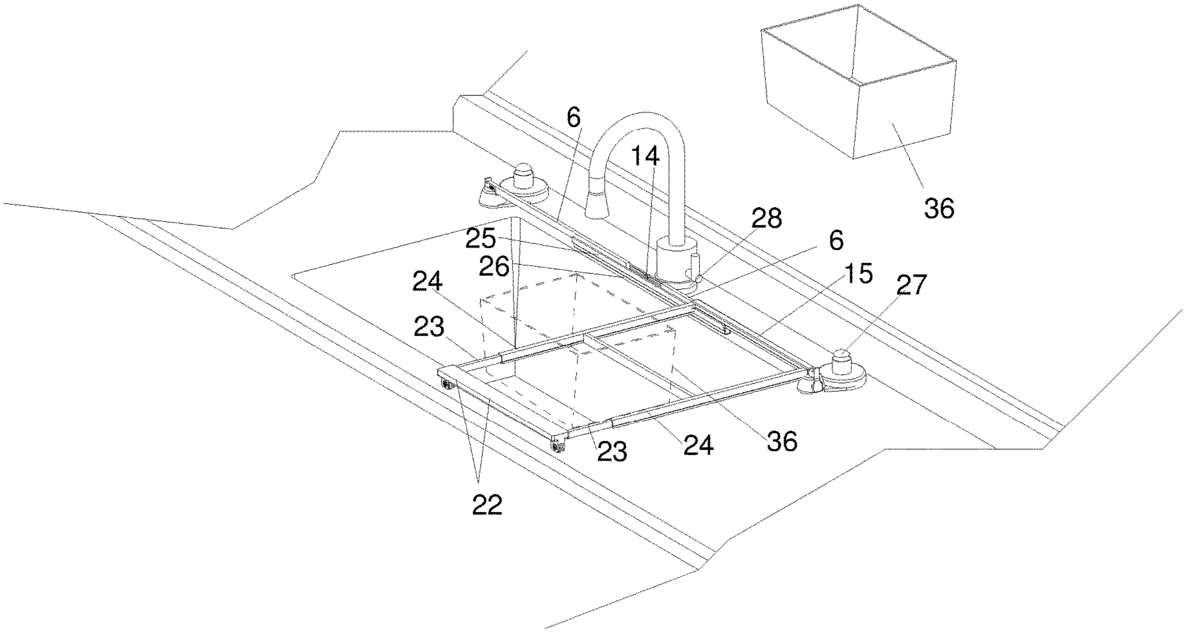

Referring now to FIG. 12 optionally telescopic guide rails/rail guides, 6, and optionally telescopic utensils and/or frames and/or platform system will be described. This embodiment also shows a structure that can support a variety of utensils an/or create a grid system for holding various drop ins such as colanders and/or food/cutlery bins etc. In some of these embodiments the "food preparation device" is a caddy or frame for supporting and carrying other food preparation devices such as bins, drying racks, cutting boards, sorters and the like.

It can be seen that a structure has been created that includes telescopic, extension member 23 and 24 for fore and aft adjustment of the side rails of the utensil, and/or utensil(s) caddy. In this way the overall depth of the device may be adjusted to accommodate various sinks. Such structures may also constructed on the underside of utensils such as cutting boards when there is not a caddy or frame construction.

Also seen is telescopic, extension member 25 for lateral adjustment of split rear rails 6. In this way the overall width of the device may be adjusted to accommodate various sinks. This is a different telescopic extension than was detailed with regard to rail extension 19. This is for an initial sizing functionality. Whereas rail extension 19 is for dynamically extending the distance a utensil may traverse. That said, extension member 25, may structurally have bearing support area 26, which may bear on the counter or sink, to lend intermediate support to the main rail(s) 6. Also seen is another exemplary device food bin/utensil bin 36, in an out of use position in solid lines and an in use position in dotted lines showing how such bins may fit within the aforementioned grid system/caddy and traverse over the sink and onto the counter/work-surface.

Figure 13:
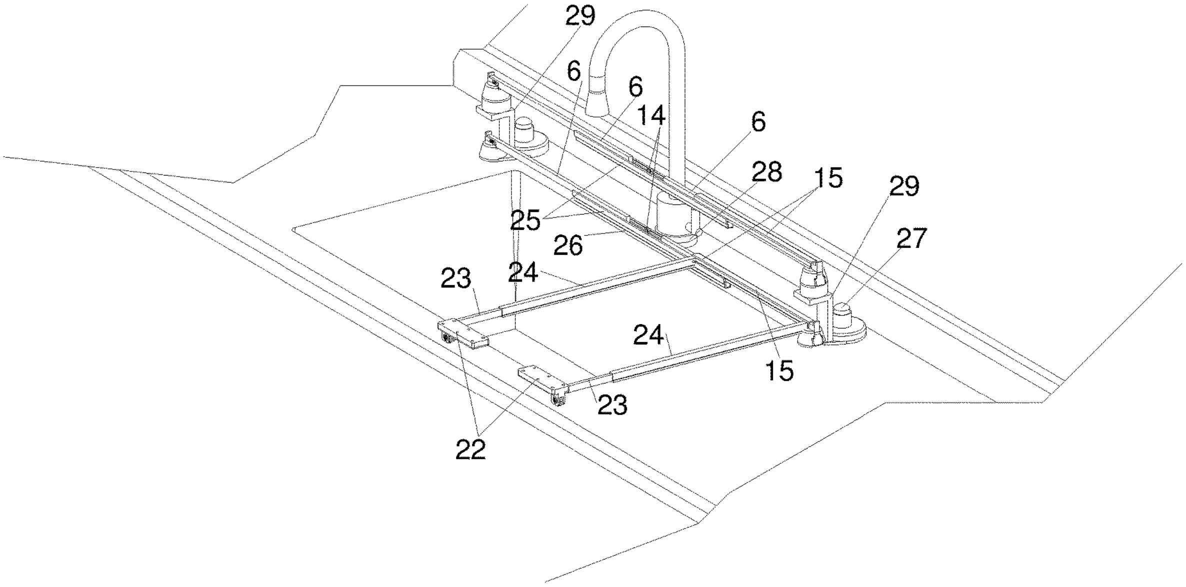
FIG. 13 is a trimetric view that structurally shows how the device may have a plurality of tiers, for the manipulation of utensils/frame platforms that may be stacked on top of one another. Also seen is how main Rail guide 6 is structurally split in two and telescopically supported via Lateral Telescopic extension 25. Such a structure enable the devices to be use on a plurality of sink/counter sizes.

Referring now to FIG. 13, FIG. 13 is a trimetric view that structurally shows how the device may have a plurality of tiers, for the manipulation of utensils/frame platforms that may be stacked on top of one another. Structural feature 29, 2$^{nd}$ tier riser/can be integral with associated parts, can be seen. In this way a complete second main rail, 6, is enabled. The front (distal to the main rail) wheeled/glide of the upper utensil/or caddy-frame (not shown) is elevated at a height greater than the first, lower tier, in order to vertically match heights with the second tier rear rail. As such, an alternative embodiment has the front (distal to the main rail) wheeled/glide of the upper utensil/or caddy-frame capable of having a plurality of heights through its own telescopic features or discrete adjustments. Additionally, because of the fore-aft telescopic features already described, the same basic utensils may be used for both tiers. This is in contrast to known configurations of "ledged" galley sinks where each tier often requires utensils of differing dimensions than the other tiers.

Figure 14:
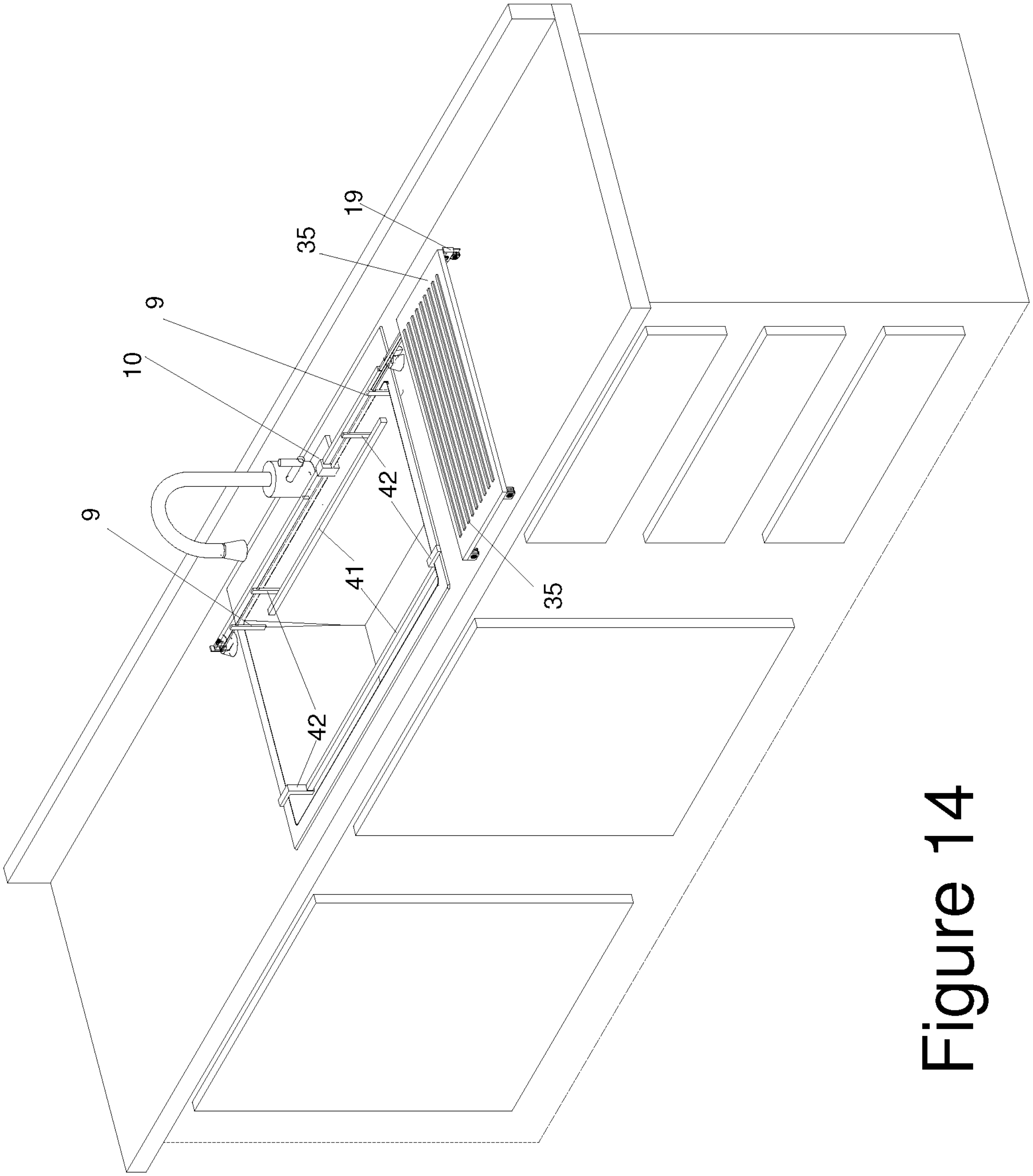
FIG. 14 is a trimetric view that includes structures that may include additive in sink guide systems; that may selectively be used/employed with or without the out of sink structures.

Referring now to FIG. 14 another embodiment(s) will be described. These embodiments include structures that may include additive in sink guide systems, that may selectively be used/employed with or without the out of sink structures already described. Lower in sink rail-guide(s) 41—may be seen. These may be disposed into the sink bowl(s) via Lower in sink rail-guide(s) hangers 42. While in this figure, only one, in sink tier is depicted, as with other embodiments, a plurality of tiers are optionally anticipated and disclosed. Structures depicted in the front and/or rear of the sink may be used interchangeably with each other or together with one another. In this structural way additional ways and methods for enabling utensil guides are structurally enables. For further illustration of operating principals, this figure includes another exemplary utensil such as a "drying rack" 35, moved into a position fully out of the sink area and onto the countertop/work-surface.

All of theses disclosed optional embodiments and claim may combined and recombined without limitation.

I claim:

1. A support device configured for use with a work-surface and a sink comprising;

a. at least a first rail to be disposed generally atop said sink, b. a kitchen utensil, with a coupling structure on a first end of said kitchen utensil and a low friction structure disposed at a second end of said kitchen utensil, c. where said first end of said kitchen utensil may be slidably coupled to said first rail, and where said low friction structure at said second end of said device is in sliding contact with said work-surface at a point outside of said sinks' envelope, so that said kitchen utensil may freely traverse laterally over said sink.

2. The device of claim 1 where the low friction structure further includes at least one wheel.

3. The device of claim 1 where the low friction structure includes a braking feature to limit lateral movement.

4. The device of claim 1 where the low friction structure has a vertical dimension greater than said coupling structure.

5. The device of claim 1 where said first rail is secured to at least one of: the work-surface, the faucet, or the sink.

6. The device of claim 1 where said first rail is telescopic to dynamically extend the amount of said traversal.

7. The device of claim 1 where said first rail is telescopic for initial sizing.

8. The device of claim 1 where said kitchen utensil is a caddy for food preparation devices.

9. The device of claim 1 including a second rail disposed above said first rail.

10. A device used with a work-surface and a sink having front, rear and sidewalls, comprising;

a. at least a first rail to be disposed above said sink's sidewalls, b. a kitchen utensil, with a coupling structure on a first end of said food preparation device and a low friction structure disposed at a second end of said kitchen utensil, c. where said first end of said device may be slidably coupled to said first rail, and said sliding structure at said second end of said kitchen utensil is in sliding contact with said work-surface, so that said kitchen utensil may freely traverse laterally.

11. The device of claim 10 where the low friction structure further includes at least one wheel.

12. The device of claim 10 where the kitchen utensil includes a braking feature to limit movement.

13. The device of claim 10 where the low friction structure has a vertical dimension greater than said coupling structure.

14. The device of claim 10 where said first rail is secured to at least one of: the work-surface, the faucet, or the sink.

15. The device of claim 10 including a second rail disposed above said first guide.

16. The device of claim 10 where said first rail is telescopic to dynamically extend the amount that said kitchen utensil may traverse freely.

17. The device of claim 10 where said first rail is telescopic for initial sizing.

18. A device used with a work-surface and a sink comprising;

a. a kitchen utensil with a first end, and a second end, b. at least a first low friction structure for engagement with said work-surface adjustably mounted to said first end, c. at least a second low friction structure for engagement with said work-surface adjustably mounted to said second end, where the distance between said first and said second low friction structures are user alterable, d. where said user may alter said distance to be a dimension greater than said users sink, e. so that said utensil may laterally traverse said work-surface and dimensionally straddle-traverse said sink.

19. The device of claim 18 where at least one of said first or second low friction structures further includes at least one wheel.

20. The device of claim 18 where at least one of said first or second low friction structures includes a braking feature to limit movement.

* * * * *